United States Patent Office 3,585,081
Patented June 15, 1971

3,585,081
BATTERY SEPARATOR
Alfred Harris Mirman, 429 5th St.,
Palisades Park, N.J. 07650
No Drawing. Filed Sept. 16, 1968, Ser. No. 760,097
Int. Cl. H01m 3/02
U.S. Cl. 136—146
9 Claims

ABSTRACT OF THE DISCLOSURE

The present invention relates to an electric storage battery including an electrolyte, a positive electrode, a negative electrode, and an electrolyte-permeable separator interposed between said electrodes and comprising a resinous base of a natural rubber, a silicone rubber, a vinylidene polymer, or a fluorocarbon polymer and a vinyl compound graft-polymerized to said resinous base.

---

This invention relates to electric storage batteries and is particularly concerned with the provision of an improved separator for use in such a battery.

A separator is included in an electric storage battery structure to help insure that the active ingredients respectively comprising the positive electrode and the negative electrode remain in the immediate vicinities of such electrodes so that the strength of the battery is maintained as nearly full as possible during the life of the same. The material of which the separator is formed should not only thus be such that it is not significantly attached by the electrolyte but also such that it will permit the necessary ionic migration within the electrolyte to an adequate extent.

Heretofore, a cellulosic material, particularly a regenerated cellulose such as cellophane, has been generally employed to form the separator incorporated in an alkaline-type battery. In an acid-type battery, on the other hand, it has been customary to utilize a separator formed of a suitable wood or natural rubber. In either case, however, the attack of the separator by the electrolyte and the consequent disintegration of the same are usually such as to result in a battery life relatively shorter than is desirable.

It has now been found that this disadvantage of such separators can be substantially mitigated by forming the separator of any of certain resinous base materials onto which a vinyl compound has been graft-polymerized.

The invention, accordingly, provides an electric storage battery including an electrolyte, a positive electrode, a negative electrode, and an electrolyte-permeable separator disposed between the electrodes and comprising a resinous base of a natural rubber, a silicone rubber, a vinylidene polymer, or a fluorocarbon polymer, onto which a vinyl compound has been graft-polymerized. The resinous base material may, if desired, have been cross-linked to a more or less degree prior to the graft-polymerization of the vinyl compound thereonto.

Where the present separator is to be included in an alkaline-type storage battery, the vinyl compound may comprise an acid-type vinyl monomer. Where such separator forms part of an acid-type storage battery, the vinyl compound may comprise an amino-type vinyl monomer. On the other hand, where the vinyl compound comprises a neutral-type vinyl monomer, the resulting separator may be employed in either type of battery.

As indicated above, a natural rubber may be utilized as the base material from which the present separator is formed. Any sufficiently solid rubber is suitable for this purpose provided, of course, that it has not been vulcanized or otherwise rendered unsatisfactory for such use.

Similar comments apply to the employment of a silicone rubber for the instant purpose. Not only should such a silicone be adequately solid for its intended use, but it should not have been otherwise treated or formulated as to render it unsuitable therefor. Many such silicones are, of course, readily available.

If the separator is to be formed from a vinylidene polymer or a fluorocarbon polymer, such polymer should be selected on the basis of the same general criteria. The principal requirement is only that any polymer of these types be such that the desired separator can be appropriately formed therefrom by solids-handling techniques.

Any such polymeric or resinous base material may also be subjected to a cross-linking treatment in order to improve or otherwise appropriately modify its properties for the purpose of the invention. Such treatment may be effected by controlled irradiation of the base material in accordance with any of the well-known procedures for accomplishing the same. Preferably, however, the cross-linking of the base material is effected chemically, advantageously in the presence of a suitable catalyst such as one of the customary peroxide compounds. Moreover, a vinyl compound, desirably a polyfunctional one such as divinyl benzene or allyl acrylate, may be employed as a cross-linking aid in this connection. In addition, part of any such cross-linking result may be effected during and/or after the graft-polymerization of the vinyl compound onto the resinous base material.

The selection of the vinyl compound to be graft-polymerized onto the resinous base material, al already mentioned, depends, at least in part, on the nature of the storage battery into which the resulting separator is to be incorporated. Suitable acid-type vinyl monomers, for example, comprise acids per se such as acrylic acid, methacrylic acid, crotonic acid, itaconic acid, vinyl acetic acid, allyl acetic acid and vinyl sulfonic acid, anhydrides such as acrylic anhydride and maleic anhydride, acyl halides such as acrylyl chloride, methacrylyl chloride and crotonyl chloride, metallic salts of such acids such as sodium acrylate, potassium acrylate, magnesium acrylate, calcium acrylate, zinc acrylate, sodium methacrylate, potassium methacrylate, magnesium methacrylate and zinc methacrylate, and aromatic compounds such as allyl phenol. Typical amino-type vinyl monomers include aliphatic amines such as allyl amine, methallyl amine, N-methyl diallyl amine and N,N-dimethyl allyl amine, aliphatic amino-esters such as N,N-diethylaminoethyl acrylate, N,N-dimethylaminoethyl methacrylate and N,N-diethylaminoethyl methacrylate, aromatic amines such as N-allyl aniline and vinyl phthalimide, and heterocyclic amino-compounds such as 2-vinyl pyridine, 4-vinyl pyridine, 2-methyl-5-vinyl pyridine, 5-vinyl-2-methyl pyridine, allyl piperidine and N-allyl pyridinium bromide. Appropriate neutral-type vinyl monomers comprise aliphatic esters such as vinyl acetate, allyl acetate, vinylene carbonate and diallyl carbonate, substituted aliphatic esters such as 2-hydroxyethyl methacrylate, vinyl chloroacetate and vinyl trifluoroacetate, aliphatic alcohols such as allyl alcohol, aliphatic and substituted aliphatic ethers such as vinyl methyl ether and allyl hydroxyethyl ether, aromatic compounds such as styrene, and heterocyclic compounds such as N-vinyl pyrrolidone.

To produce the separator, the desired polymeric or resinous base material is admixed with and/or dissolved in an appropriate organic solvent, which may desirably be an aromatic compound such as benzene. Upon addition of the selected vinyl monomer thereto, the resulting mixture is heated, preferably in the presence of a suitable catalyst, which may be a peroxide such as benzoyl peroxide, to effect polymerization of the vinyl monomer and bonding or grafting of the polymerized vinyl monomer to the base material. To control the length of the grafted vinyl polymer chains, a chain-stopping agent such as chloroacetic acid may be utilized. As will be appreciated, the solid base material may be employed in sheet, rod, granular or other shape.

The resulting reaction product is thereafter appropriately converted into a more or less viscous solution, which can then be cast into film form. Alternatively, such solid reaction product can be suitably extruded into such film form. In either case, the film so produced is heated, advantageously in the presence of a cross-linking agent such as triallyl cyanurate, to provide a sheet from which the desired separator can be obtained.

A separator so produced possesses in general a mechanical strength, not only in the dry state but also upon immersion in an electrolyte, materially superior to that of previous, conventional separators. In addition, a battery incorporating such a separator can be subjected to significantly more successive charge-discharge cycles and thus exhibits a longer life. Finally, the present separator is unusually stable under battery operating conditions, possesses an improved dimensional stability and a greater resistance to swelling in the presence of the electrolyte, can generally be thinner without adverse structural or other effect, and exhibits a better performance at relatively high operating temperatures.

The grafted polymer chains impart to the base material a structure resulting, in effect, in a molecular sieve more conducive to the necessary ionic migration. The extent of such improvement is, of course, related to the degree to which the base material has been subjected to the graft-polymerization; and it will be understood that the amount of the vinyl monomer employed in carrying out such graft-polymerization should be sufficient to modify the base material in this regard to the degree desired. This characteristic, as well as those described above, can in general be further improved by utilizing a resinous base material that has been appropriately cross-linked.

The following examples, in which all parts are expressed by weight, are illustrative of the present invention:

EXAMPLE 1

10 parts of a silicone rubber are admixed with 75 parts of benzene. To such mixture are added 10 parts of methacrylic acid, 1 part of chloroacetic acid, and 4 parts of benzoyl peroxide. Upon standing overnight, such system is heated under reflux at 80° C. for three hours. The resulting mixture is thereupon cooled and separates into two layers, the upper, solvent layer of which is decanted.

The reacted solids are then worked several times with de-ionized water, whereupon they are dissolved in 10% aqueous KOH to provide a viscous solution. After introduction thereinto of 3 parts of triallyl cyanurate, such solution is cast on a clean glass surface to form a film, the thickness of which is controlled as by a doctor blade.

The cast film is now heated to dryness and thereby provides a material excellently suitable for use as a separator in a silver oxide-zinc alkaline battery. Upon incorporation into such a battery, such separator effectively improved the cycle life of the same and also positively limits any zinc dendrite growth.

Moreover, such separator in the dry state has a tensile strength of 800 to 1000 pounds per square inch and, when wet with 40% aqueous KOH, has a tensile strength of about 600 pounds per square inch. The cycle life of such separator in 25% aqueous KOH is on the order of 600 to 800 cycles and in 40% aqueous KOH is on the order of 100 to 150 cycles.

EXAMPLE 2

The procedure of Example 1 is repeated except that the reacted solids are extruded in sheet form from an appropriate screw extruder and the resulting sheet is calendered. A separator obtained from such sheet possesses properties essentially the same as those set forth for the cast-film separator in Example 1.

EXAMPLE 3

The procedure of Example 1 is carried out with the following changes: 10 parts of 4-vinyl pyridine and 1 part of chloro-formamide are added to the admixture of the silicone rubber in the benzene. The reacted solids are dissolved in 10% hydrochloric acid to form the viscous casting solution.

The resultant film provides an excellent material for a separator for use in a lead-acid storage battery, such separator possessing good mechanical strength, exhibiting desirable flexibility, and effectively increasing the life of the battery.

EXAMPLE 4

The procedure of Example 3 is repeated except that the reacted solids are suitably extruded in sheet form from an extruder and the resulting sheet is calendered. The properties of a separator cut from such sheet are in essence the same as those indicated in Example 3 for the cast-film separator.

EXAMPLE 5

The procedure of Example 1 is again carried out but with the following changes: 10 parts of vinyl acetate and 1 part of carbon tetrachloride are added to the silicone rubber-benzene admixture. The reacted solids, after the initial washing, are treated with 10% aqueous KOH and are then again washed to a neutral state with water. Such solids are now dissolved in xylene to provide a 10% solution, from which a film is cast.

A separator cut from the resultant film provides excellent service in either an alkaline-type battery or a lead-acid battery.

I claim:

1. An electric storage battery including an electrolyte, a positive electrode, a negative electrode, and an electrolyte-permeable separator interposed between said electrodes said separator consists of a resinous base selected from the group consisting of a natural rubber, a silicone rubber, a vinylidene polymer and a fluorocarbon polymer and a vinyl compound graft-polymerized to said resinous base.

2. An electric storage battery according to claim 1, which is an alkaline-type storage battery and in which the vinyl compound is an acid-type vinyl monomer.

3. An electric storage battery according to claim 2, in which the resinous base is cross-linked.

4. An electric storage battery according to claim 1, which is an acid-type storage battery and in which the vinyl compound is an amino-type vinyl monomer.

5. An electric storage battery according to claim 4, in which the resinous base is cross-linked.

6. An electric storage battery according to claim 1, which is an acid-type or alkaline-type storage battery and in which the vinyl compound is a neutral-type vinyl monomer.

7. An electric storage battery according to claim 6, in which the resinous base is cross-linked.

8. An electric storage battery according to claim 2 in which the vinyl compound is methacrylic acid.

9. An electric storage battery according to claim 1 wherein the separator is a resinous base of a silicone rubber and methacrylic acid which is graft-polymerized to said silicone rubber.

References Cited

UNITED STATES PATENTS

| | | | |
|---|---|---|---|
| 2,400,091 | 5/1946 | Alfthan | 136—146UX |
| 2,653,986 | 9/1953 | Philipps | 136—146X |
| 2,694,744 | 11/1954 | Tamburini | 136—146 |
| 3,330,702 | 7/1967 | Horowitz | 136—146 |
| 3,427,206 | 2/1969 | Scardaville et al. | 136—146 |

DONALD L. WALTON, Primary Examiner